(12) United States Patent
Klingbeil

(10) Patent No.: US 11,578,684 B2
(45) Date of Patent: Feb. 14, 2023

(54) METHOD FOR OPERATING AN ENGINE

(71) Applicant: Transportation IP Holdings, LLC, Norwalk, CT (US)

(72) Inventor: Adam Edgar Klingbeil, Ballston Lake, NY (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 0 days.

(21) Appl. No.: 17/450,976

(22) Filed: Oct. 14, 2021

(65) Prior Publication Data

US 2022/0034284 A1 Feb. 3, 2022

Related U.S. Application Data

(63) Continuation-in-part of application No. 15/013,432, filed on Feb. 2, 2016, now abandoned, which is a
(Continued)

(51) Int. Cl.
*F02M 26/43* (2016.01)
*F02M 25/022* (2006.01)
(Continued)

(52) U.S. Cl.
CPC ......... *F02M 26/43* (2016.02); *F02D 41/0052* (2013.01); *F02D 41/0055* (2013.01);
(Continued)

(58) Field of Classification Search
CPC .... F02M 26/43; F02M 26/05; F02M 25/0227; F02M 25/10; F02D 41/0052;
(Continued)

(56) References Cited

U.S. PATENT DOCUMENTS

| 4,402,212 A | 9/1983 | Childs |
| 4,495,930 A | 1/1985 | Nakajima |
| (Continued) | | |

FOREIGN PATENT DOCUMENTS

| CN | 1639452 A | 7/2005 |
| CN | 1701169 A | 11/2005 |
| (Continued) | | |

OTHER PUBLICATIONS

Mellde, R. et al., "Advanced Automobile Engines for Fuel Economy, Low Emissions, and Multifuel Capability," Annual Review of Energy, vol. 14, Nov. 1989, 20 pages.
(Continued)

*Primary Examiner* — Logan M Kraft
*Assistant Examiner* — John D Bailey
(74) *Attorney, Agent, or Firm* — McCoy Russell LLP

(57) ABSTRACT

Systems and methods for controlling fuel factions delivered to different cylinders are provided. In one example, a controller is configured to, during a single engine cycle and responsive to a first condition, deliver a lower fraction of a first fuel into a donor cylinder in comparison to a fraction of the first fuel being injected into a non-donor cylinder and deliver a higher fraction of a second fuel into the donor cylinder in comparison to a fraction of the second fuel being injected into the non-donor cylinder.

17 Claims, 4 Drawing Sheets

Related U.S. Application Data continuation-in-part of application No. 13/484,621, filed on May 31, 2012, now Pat. No. 9,249,744.

(51) Int. Cl.
  *F02M 25/10* (2006.01)
  *F02M 26/05* (2016.01)
  *F02D 41/00* (2006.01)

(52) U.S. Cl.
  CPC ..... *F02D 41/0065* (2013.01); *F02M 25/0227* (2013.01); *F02M 25/10* (2013.01); *F02M 26/05* (2016.02); *F02D 2200/0414* (2013.01); *F02D 2200/0611* (2013.01); *F02D 2200/0802* (2013.01)

(58) Field of Classification Search
  CPC ............. F02D 41/0055; F02D 41/0065; F02D 2200/0414; F02D 2200/0611; F02D 2200/0802
  USPC ........................................................ 701/103
  See application file for complete search history.

(56) References Cited

U.S. PATENT DOCUMENTS

| | | | |
|---|---|---|---|
| 5,370,097 A * | 12/1994 | Davis | F02D 19/061 123/526 |
| 5,560,326 A | 10/1996 | Merritt | |
| 5,642,705 A | 7/1997 | Morikawa et al. | |
| 5,713,328 A | 2/1998 | Anderson et al. | |
| 5,875,743 A | 3/1999 | Dickey | |
| 5,890,459 A | 4/1999 | Hedrick et al. | |
| 5,911,210 A | 6/1999 | Flach | |
| 6,101,986 A | 8/2000 | Brown et al. | |
| 6,230,683 B1 | 5/2001 | zur Loye et al. | |
| 6,276,334 B1 | 8/2001 | Flynn et al. | |
| 6,286,482 B1 | 9/2001 | Flynn et al. | |
| 6,463,907 B1 | 10/2002 | Hiltner | |
| 6,543,395 B2 | 4/2003 | Green | |
| 6,659,071 B2 | 12/2003 | LaPointe et al. | |
| 6,907,870 B2 | 6/2005 | zur Loye et al. | |
| 6,912,992 B2 | 7/2005 | Ancimer et al. | |
| 6,915,776 B2 | 7/2005 | zur Loye et al. | |
| 6,951,202 B2 | 10/2005 | Oda | |
| 7,019,626 B1 | 3/2006 | Funk | |
| 7,107,942 B2 | 9/2006 | Weissman | |
| 7,387,091 B2 | 6/2008 | Ritter | |
| 7,503,312 B2 | 3/2009 | Surnilla et al. | |
| 7,533,634 B2 | 5/2009 | Ritter et al. | |
| 7,549,408 B2 | 6/2009 | Russell | |
| 7,556,030 B2 | 7/2009 | Ashida et al. | |
| 7,640,913 B2 | 1/2010 | Blumberg et al. | |
| 7,740,000 B2 | 6/2010 | He et al. | |
| 7,861,518 B2 | 1/2011 | Federle | |
| 7,913,664 B2 | 3/2011 | Williams et al. | |
| 7,983,831 B2 | 7/2011 | Tsunooka | |
| 8,006,677 B2 | 8/2011 | Williams et al. | |
| 8,032,294 B2 | 10/2011 | Loeffler et al. | |
| 8,037,850 B2 | 10/2011 | Pursifull | |
| 8,402,939 B2 | 3/2013 | Reuss et al. | |
| 8,555,702 B2 | 10/2013 | Sgatti et al. | |
| 8,584,657 B2 | 11/2013 | Yagi et al. | |
| 8,733,298 B2 | 5/2014 | Haskara et al. | |
| 8,893,691 B2 | 11/2014 | Payne et al. | |
| 8,903,632 B2 * | 12/2014 | Peters | F02M 26/35 123/676 |
| 8,931,255 B2 | 1/2015 | Wilson | |
| 9,027,538 B2 | 5/2015 | Lepley | |
| 9,334,841 B1 | 5/2016 | Jackson et al. | |
| 2002/0007816 A1 | 1/2002 | Zur Loye et al. | |
| 2002/0020388 A1 | 2/2002 | Wright et al. | |
| 2003/0037978 A1 | 2/2003 | Hofbauer | |
| 2003/0213449 A1 | 11/2003 | Bloms et al. | |
| 2003/0221661 A1 | 12/2003 | Willi et al. | |
| 2004/0103860 A1 | 6/2004 | zur Loye et al. | |
| 2004/0123849 A1 | 7/2004 | Bryant | |
| 2004/0177837 A1 | 9/2004 | Bryant | |
| 2004/0182378 A1 | 9/2004 | Oshimi et al. | |
| 2005/0121005 A1 * | 6/2005 | Edwards | F02D 41/2422 123/525 |
| 2005/0205021 A1 | 9/2005 | Schute | |
| 2006/0032477 A1 | 2/2006 | May | |
| 2006/0102145 A1 | 5/2006 | Cohn et al. | |
| 2006/0180121 A1 | 8/2006 | Wickman et al. | |
| 2007/0079647 A1 | 4/2007 | Aoyama | |
| 2007/0095331 A1 | 5/2007 | Ayame | |
| 2007/0119425 A1 | 5/2007 | Lewis et al. | |
| 2007/0137514 A1 | 6/2007 | Kumar et al. | |
| 2007/0295316 A1 * | 12/2007 | Davis | F02D 19/0647 123/689 |
| 2008/0053399 A1 | 3/2008 | Bromberg et al. | |
| 2008/0098726 A1 | 5/2008 | Donaldson et al. | |
| 2008/0103676 A1 | 5/2008 | Ancimer et al. | |
| 2008/0110161 A1 | 5/2008 | Persson | |
| 2008/0121136 A1 | 5/2008 | Mari et al. | |
| 2008/0262701 A1 * | 10/2008 | Williams | F02D 19/0676 705/14.27 |
| 2009/0029244 A1 | 1/2009 | Asahina et al. | |
| 2009/0025695 A1 | 6/2009 | Wolber et al. | |
| 2009/0271090 A1 | 10/2009 | Surnilla et al. | |
| 2010/0012058 A1 | 1/2010 | Hu | |
| 2010/0030448 A1 | 2/2010 | Roth et al. | |
| 2010/0162678 A1 | 7/2010 | Annigeri et al. | |
| 2010/0299049 A1 * | 11/2010 | Kang | F02D 41/402 701/113 |
| 2011/0015856 A1 | 1/2011 | Arnold | |
| 2011/0079197 A1 | 4/2011 | Stewart et al. | |
| 2011/0088654 A1 | 4/2011 | Courtoy et al. | |
| 2011/0113774 A1 | 5/2011 | Nunn et al. | |
| 2011/0114058 A1 | 5/2011 | Cohn et al. | |
| 2011/0118914 A1 | 5/2011 | Brooks et al. | |
| 2011/0132285 A1 * | 6/2011 | Pursifull | F02D 41/0027 123/3 |
| 2011/0132286 A1 * | 6/2011 | Leone | F02M 31/18 123/3 |
| 2011/0132323 A1 * | 6/2011 | Surnilla | F02D 19/081 123/406.19 |
| 2011/0137470 A1 | 6/2011 | Surnilla et al. | |
| 2011/0184629 A1 | 7/2011 | Krengel et al. | |
| 2011/0209459 A1 | 9/2011 | Hancu et al. | |
| 2011/0253113 A1 * | 10/2011 | Roth | F02D 41/008 123/568.12 |
| 2011/0264355 A1 * | 10/2011 | Iwatani | F02M 43/00 123/575 |
| 2011/0283684 A1 * | 11/2011 | Aso | F02D 41/123 60/285 |
| 2011/0283959 A1 * | 11/2011 | Aso | F01N 3/30 123/3 |
| 2011/0288738 A1 | 11/2011 | Donnelly et al. | |
| 2012/0004830 A1 * | 1/2012 | Miyagawa | F02M 43/00 701/103 |
| 2012/0004831 A1 * | 1/2012 | Miyagawa | F02D 41/0025 701/103 |
| 2012/0210988 A1 | 8/2012 | Willi | |
| 2012/0298070 A1 * | 11/2012 | Akinyemi | F02D 41/0047 123/294 |
| 2012/0323465 A1 * | 12/2012 | Peters | F02M 26/43 701/104 |
| 2012/0323470 A1 * | 12/2012 | Klingbeil | F02M 26/50 701/108 |
| 2012/0325180 A1 | 12/2012 | Montgomery | |
| 2013/0000614 A1 * | 1/2013 | Freund | F02M 26/38 123/568.2 |
| 2013/0030672 A1 * | 1/2013 | Klingbeil | F02D 41/0052 701/109 |
| 2013/0054116 A1 * | 2/2013 | Lepley | F02D 41/0025 701/104 |
| 2013/0133616 A1 * | 5/2013 | Klingbeil | F02D 41/0025 123/304 |
| 2013/0158752 A1 | 6/2013 | Norton | |

(56) References Cited

U.S. PATENT DOCUMENTS

| | | | |
|---|---|---|---|
| 2013/0283766 A1* | 10/2013 | Primus | F02D 41/0055 60/272 |
| 2013/0289849 A1 | 10/2013 | Uehara et al. | |
| 2013/0311066 A1 | 11/2013 | Guimaraes et al. | |
| 2014/0261345 A1 | 9/2014 | Bromberg et al. | |
| 2014/0278011 A1* | 9/2014 | Geckler | F02D 41/0087 701/108 |
| 2015/0198070 A1 | 7/2015 | Record et al. | |
| 2015/0275781 A1 | 10/2015 | Matar et al. | |
| 2016/0069286 A1* | 3/2016 | Zielinski | F02D 43/00 123/445 |
| 2016/0069287 A1* | 3/2016 | Lavertu | F02D 41/005 701/103 |
| 2016/0069301 A1* | 3/2016 | Karunaratne | F02M 26/50 123/568.12 |
| 2016/0108873 A1* | 4/2016 | Jackson | F02D 19/0694 123/445 |
| 2016/0138526 A1* | 5/2016 | Peters | F02D 41/221 123/568.2 |
| 2016/0169142 A1* | 6/2016 | Klingbeil | F02D 19/0692 123/435 |
| 2016/0230712 A1* | 8/2016 | Akinyemi | F02D 41/0065 |
| 2016/0252027 A1* | 9/2016 | Jackson | F02D 19/0694 60/605.2 |
| 2017/0314481 A1* | 11/2017 | Karunaratne | F02M 26/43 |

FOREIGN PATENT DOCUMENTS

| | | |
|---|---|---|
| CN | 101201020 A | 6/2008 |
| CN | 102400797 A | 4/2012 |
| DE | 19922748 A1 | 11/2000 |
| DE | 102004051287 A1 | 4/2006 |
| DE | 102006020223 B3 | 8/2007 |
| DE | 102010036131 A1 | 3/2012 |
| EP | 2336529 A2 | 6/2011 |
| JP | 2000145488 A | 5/2000 |
| JP | 2004108153 A | 4/2004 |
| JP | 2008274954 A | 11/2008 |
| JP | 2010065604 A | 3/2010 |
| RU | 2136918 C1 | 9/1999 |
| WO | 9421911 A1 | 9/1994 |
| WO | 03076788 A1 | 9/2003 |
| WO | 2011128692 A1 | 10/2011 |
| WO | 2011153069 A1 | 12/2011 |

OTHER PUBLICATIONS

Kessels, J. et al., "Integrated Energy & Emission Management for Hybrid Electric Truck with SCR aftertreatment," Proceedings of the 2010 IEEE Vehicle Power and Propulsion Conference, Sep. 1, 2010, Lille, France, 6 pages.

Qian, D. et al., "Research of the Influence of Combustion Chamber Structure on Performance of Dual Fuel Engine," Proceedings of the 2011 International Conference on Electric Information and Control Engineering, Apr. 15, 2011, Wuhan, China, 3 pages.

ISA European Patent Office, International Search Report Issued in Application No. PCT/US2012/064929, dated Mar. 6, 2013, WIPO, 4 pages.

ISA European Patent Office, Written Opinion of the International Searching Authority Issued in Application No. PCT/US2012/064929, dated Mar. 6, 2013, WIPO, 5 pages.

United States Patent and Trademark Office, Office Action Issued in U.S. Appl. No. 13/328,438, dated Jun. 19, 2013, 10 pages.

ISA European Patent Office, International Search Report Issued in Application No. PCT/US2013/047501, dated Nov. 6, 2013, WIPO, 4 pages.

ISA European Patent Office, Written Opinion of the International Searching Authority Issued in Application No. PCT/US2013/047501, dated Nov. 6, 2013, WIPO, 8 pages.

Great Britain Intellectual Property Office, Combined Search and Examination Report under Sections 17 and 18(3) Issued in Application No. GB1309361.2, dated Nov. 25, 2013, 7 pages.

United States Patent and Trademark Office, Office Action Issued in U.S. Appl. No. 13/551,748, dated Aug. 1, 2014, 15 pages.

United States Patent and Trademark Office, Office Action Issued in U.S. Appl. No. 14/251,726, dated Jan. 23, 2015, 8 pages.

United States Patent and Trademark Office, Office Action Issued in U.S. Appl. No. 13/551,748, dated Jan. 26, 2015, 24 pages.

United States Patent and Trademark Office, Notice of Allowance Issued in U.S. Appl. No. 13/551,748, dated Jun. 16, 2015, 18 pages.

United States Patent and Trademark Office, Office Action Issued in U.S. Appl. No. 14/251,726, dated Aug. 15, 2015, 14 pages.

State Intellectual Property Office of the People's Republic of China, Office Action and Search Report Issued in Application No. 201280062097.8, dated Nov. 13, 2015, 19 pages. (Submitted with Partial Translation).

State Intellectual Property Office of the People's Republic of China, Office Action and Search Report Issued in Application No. 201310211815.X, dated Jun. 29, 2016, 23 pages. (Submitted with Partial Translation).

* cited by examiner

METHOD FOR OPERATING AN ENGINE

CROSS REFERENCE TO RELATED APPLICATIONS

The present application is a continuation-in-part of U.S. patent Ser. No. 15/013,432, filed Feb. 2, 2016, and entitled METHOD FOR OPERATING AN ENGINE. U.S. patent Ser. No. 15/103,432 is a continuation-in-part of U.S. patent Ser. No. 13/484,621, filed May 31, 2012, and entitled METHOD FOR OPERATING AN ENGINE. The contents of each of the above-identified application are incorporated herein by reference in their entirety.

FIELD

This invention relates generally to methods for operating an engine. More particularly, this invention relates to methods for introduction of a plurality of fuels into an internal combustion engine for operating such an engine.

BACKGROUND

Internal combustion engines have been widely used in many fields, such as vehicles due to high power-to-weight ratios together with high fuel energy density. In recent years, with increasing attention of reducing pollution of harmful engine emissions to environment, internal combustion engines, such as compression ignition engines (also known as "diesel" engines) can be modified to burn a plurality of fuels, such as both natural gas and diesel fuels, which is referred to as dual fuel operation.

During some types of dual fuel operation, the natural gas may be premixed with an intake air, and then the mixture is introduced into engine cylinders during intake strokes thereof. Subsequently, compression strokes of the engine cylinders start and proceed to increase pressure and temperature of the mixture. At the end of the compression strokes, a small quantity of the diesel fuel is injected into the engine cylinders to ignite the mixture of the intake air and the natural gas by the auto-ignition of the diesel fuel so as to trigger combustion in the engine cylinders.

As a result, the substitution of the natural gas for the diesel fuel can reduce the emissions of the pollutants, such as nitrogen oxides ($NO_x$), and particulate matter (PM). However, when the operation of such engines is switched from a steady state to an increased load state, such as a transient acceleration state, the quantity of the natural gas is increased significantly to provide desirable power, which results in reduction of the air fuel ratio (AFR) and may cause the auto-ignition of the premixed natural gas accordingly. The auto-ignition of the premixed natural gas may cause detonation or knocking in the engine cylinders, thereby damaging the engine.

There have been attempts to avoid the detonation or knocking in the engine cylinders. For example, to enable the dual fuel operation, the compression ratio of the engine cylinders may be reduced. This may result in reduction of the cycle efficiency of the engines and increased challenges during cold start. Alternatively, during the dual fuel operation, the substitution of the natural gas to the diesel fuel may be reduced, which increases the harmful engine emissions and the fuel cost due to the increased quantity of the diesel fuel.

Additionally, sudden increases in load may result in increased temperature of an aftertreatment system. If the aftertreatment system has built up flammable substances (e.g., oil, unburned fuel, or soot particles), uncontrolled combustion in the aftertreatment system may occur, thereby causing damage to the aftertreatment system.

Attempts to avoid uncontrolled oxidation in the aftertreatment have primarily looked to limiting the rate of load increase. However, this can result in degraded performance when fast load increase is desired.

Therefore, there is a need for new and improved methods for operating an internal combustion engine.

BRIEF DESCRIPTION

A method for operating an engine is provided in accordance with one embodiment of the invention. The method comprises introducing a first fuel, a second fuel and an oxidant into a first engine cylinder and a second engine cylinder; monitoring a plurality of engine parameters; and adjusting a quantity of one of the first fuel, the second fuel, and the oxidant introduced to the first engine cylinder to be different from a quantity of one of the first fuel, the second fuel, and the oxidant introduced to the second engine cylinder based at least one of the plurality of monitored engine parameters. A method for operating an engine is provided in accordance with another embodiment of the invention. The method comprises introducing a first fuel, a second fuel and an oxidant into a first engine cylinder to operate the engine; monitoring a plurality of engine parameters; and increasing a quantity of the second fuel introduced in the first engine cylinder based on one of the plurality of monitored engine parameters; and reducing a quantity of the first fuel introduced in the first engine cylinder based on one of the plurality of monitored engine parameters in response to an increased load operation of the engine.

A method for operating an engine is provided in accordance with yet another embodiment of the invention. The method for operating an engine, comprises introducing a first fuel, a second fuel and an oxidant into a first engine cylinder set and a second engine cylinder set; monitoring a plurality of engine parameters; increasing a quantity of the second fuel and reducing a quantity of the first fuel in the first engine cylinder set in response to an increased load operation of the engine; and adjusting a quantity of one of the first fuel, the second fuel and the oxidant introduced to the second engine cylinder set to be different from a quantity of one of the first fuel, the second fuel, and the oxidant introduced to the first engine cylinder set.

A method for operating an internal combustion engine is provided in accordance with yet another embodiment of the invention. The method of operating an internal combustion engine, said internal combustion engine comprising a first cylinder set and a second cylinder set, the method comprises: introducing a first fuel, a second fuel, and an oxidant into the first cylinder set, thereby defining a first substitution rate; introducing a first fuel, a second fuel, and an oxidant into the second cylinder set, thereby defining a second substitution rate; monitoring at least one engine parameter; and adjusting the first substitution rate to a third substitution rate in at least one cylinder of the first cylinder set, in response to the monitoring, wherein the third substitution rate is different than the second substitution rate.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the disclosure in unnecessary detail.

In embodiments of the invention, a method for operating an engine is provided. The engine may comprise an internal combustion engine or other types of engines. Typically, the method employs a plurality of fuels to operate the engine. In one non-limiting example, the method is provided to operate the engine to switch from a steady state to an increased load state. As used herein, in some applications, the term "steady state" may indicate engine load or engine speed is substantially stable.

The fuels at least comprise a first fuel and a second fuel. The first and second fuels comprise a non-compression-combustible fuel and a compression-combustible fuel, respectively. As used herein, the term "non-compression-combustible fuel" means any single material or combination of materials that will not spontaneously ignite or combust under typical operating conditions, but will ignite or burn with the aid of an ignition spark or flame in a reciprocating engine cylinder.

It is known to one skilled in the art that most fuels will be compression-combustible at sufficiently high temperatures, but the non-compression-combustible fuels referred to here are fuels that are intended to ignite via flame propagation only and that auto-ignition or compression-combustion be avoided. Non-limiting examples of such fuels include hydrogen, natural gas, ethanol or gasoline.

The term "compression-combustible fuel" means any single material or combination of materials that are intended to spontaneously ignite or combust, without the aid of an ignition spark or existing flame, in a reciprocating engine cylinder during and/or immediately after a compression stroke of a piston therein. Non-limiting examples of the compression-combustible fuels include ammonia, diesel, kerosene and heavy fuel oil.

During the increased load state of the engine, the quantity of the first fuel may be reduced and the quantity of the second fuel is increased for introduction into a cylinder of the engine, as compared to operation in the steady state thereof, such that the total fuels into the engine is increased. In some examples, the quantity of the first fuel is decreased to be in a range of from about 70% to about 50% and the quantity of the second fuel is increased to be in a range of from 30% to about 50%.

The term "substitution rate" as used herein means the relative quantity of non-compression-combustible fuel to the total fuel used in the combustion chamber during an engine cycle.

Figure 1:
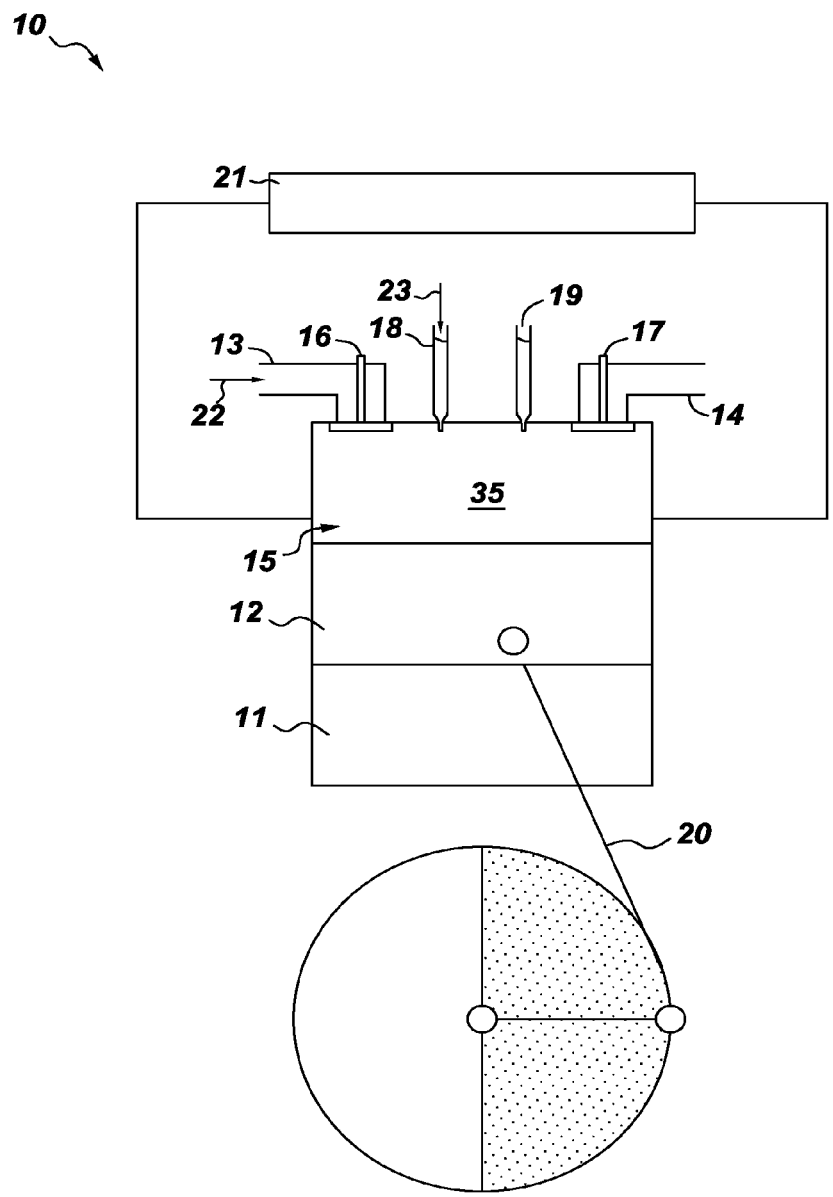
FIG. 1 is a schematic diagram of an engine cylinder of an engine in accordance with one embodiment of the disclosure.

FIG. 1 illustrates a schematic diagram of a cylinder 11 of an engine 10 in accordance with one embodiment of the invention. Although a single cylinder 11 of the engine 10 is illustrated, the engine 10 may comprise more than one cylinder, for example four, six, eight, or twelve cylinders cooperating to provide suitable power based on different applications. See e.g., FIG. 2. For ease of illustration, other elements, such as sensors and sealing elements are not illustrated in FIG. 1.

As illustrated in FIG. 1, the engine 10 comprises the cylinder 11 having a piston 12 movably located therein. An intake manifold 13 and an exhaust manifold 14 are in fluid communication with a combustion chamber 15 defined within the cylinder 11, respectively. The intake manifold 13 is configured to provide an input pathway (not labeled) for introduction of an oxidant and a first fuel into the combustion chamber 15. Alternatively, the intake manifold 13 is configured to provide an input pathway (not labeled) for introduction of only an oxidant from the intake manifold 13 into the combustion chamber 15 (i.e., the first and second fuel are injected directly into the combustion chamber 15). The exhaust manifold 14 is configured to provide an output pathway (not labeled) for all products of a combustion event that takes place in the combustion chamber 15.

A plurality of valves, such as an intake valve 16 and an exhaust valve 17 are configured to actuate at certain times and for certain durations to open and close fluid pathways (not labeled) between the combustion chamber 15 and the respective intake manifold 13 and the exhaust manifold 14. Additionally, one or more injectors, such as first and second injectors 18, 19 are also in fluid communication with the combustion chamber 15 so as to provide at least one fuel into the combustion chamber 15. Second injector 19 may provide a second fuel or also provide a first fuel. It should be clear to one skilled in the art that any of the injectors may be in direct communication with the combustion chamber or may only be in fluid communication with the combustion chamber through a manifold such as the intake manifold or via a prechamber A connecting rod 20 is disposed between and connecting the piston 12 and a transmission mechanism, such as a crank shaft (not shown) so as to transmit the translational mechanical energy generated by the engine 10 into rotational energy for further use.

In addition, the engine further comprises a control unit 21 configured to control operation or status of the engine based on outputs from a plurality of sensors (not shown). The sensors are configured to monitor or detect a plurality of (measured or monitored) engine parameters including pressures, temperatures, flow rates, speed and power so that the control unit 21 determines and controls other parameters including, but not limited to fuel injection timings and quantities for all fuels being introduced accordingly.

Non-limiting examples of the plurality of sensors include fuel injection timing sensors, fuel flow sensors, throttle position sensors, manifold air pressure sensors, manifold air temperature sensors, exhaust gas temperature sensors, engine power sensors, knock sensors or the like. Thus, in non-limiting examples, the measured engine parameters may comprise at least one of engine speed, engine load, engine throttle position, intake manifold temperature, intake manifold pressure, exhaust gas flow rate and temperature, air flow into the cylinder, compression ratio, intake and exhaust valve timing.

In other embodiments, examples of other engine parameters may comprise a status of one or more sensors. For example, a measured engine parameter may comprise if a particular sensor (e.g., knock sensor, temperature sensor, etc.) is broken or not operating correctly.

In still another embodiment, another engine parameter may comprise an aftertreatment status. The aftertreatment status may comprise temperature, flow, and/or pressure drop of a predetermined quantity, whether the aftertreatment is regenerating, measured engine operation over time, anticipated regeneration start event, estimated collection of flammable substances in the aftertreatment system, and the like.

Generally, during operation of a so-called four-stroke engine, each cylinder, such as the cylinder 11 of the engine 10 typically undergoes a four stroke cycle including an intake stroke, a compression stroke, an expansion stroke, and an exhaust stroke. As referred to FIG. 1, during the intake stroke, the exhaust valve 17 closes and the intake valve 16 opens. A mixture 22 is introduced into the combustion chamber 15 through the intake manifold 13 while the piston 12 moves towards a bottom of the cylinder 11 to increase the volume within the combustion chamber 15 until the piston 12 moves to a position where the combustion chamber 15 is at its largest volume, which is typically referred to as a bottom dead center (BDC) to complete the intake stroke. It will be apparent to one skilled in the art that this invention is not limited to a four-stroke engine and will work for other types of engines such as two-stroke engines and rotary engines, for example.

For the illustrated arrangement, the mixture 22 comprises the first fuel, such as the natural gas and at least one oxidant. In non-limiting examples, the at least one oxidant comprises air, pure oxygen, or either of which may be mixed with re-circulated exhaust gas. Prior to introduction of the mixture 22 into the combustion chamber 15, the at least one oxidant and the first fuel are premixed. In one non-limiting example, the premixing may take place in the intake manifold 13. Due to the employment of the control unit 21, the quantities and/or premixing of the first fuel and the at least one oxidant may be controlled based on the detected engine parameters.

As used herein, the term "premixed" means increasing the level, degree, and/or factor of homogeneity of two, or more, substances prior to an event. By example only, the air and the first fuel may be premixed to generate the premixed mixture 22 prior to the combustion event such that the level or degree homogeneity of the air and the first fuel has increased. Once the mixture 22 enters the combustion chamber 15 it may be defined as a second mixture 35.

In an alternative embodiment, the mixture 22 may comprise only one or more oxidants being introduced into the combustion chamber 15 from the intake manifold 13, wherein the first and second fuel are injected directly into the combustion chamber 15 via one or more injectors (e.g., 19, 23).

As used herein, the term "combustion event" means the activities occurring when a fuel(s)/air mixture is ignited and/or burned, partially or entirely, in a combustion chamber of an engine, thereby producing heat, carbon dioxide, steam, and other chemicals, regardless of whether the event was via spark ignition, compression ignition, or other suitable means.

Subsequently, during the compression stroke, the intake valve 16 and the exhaust valve 17 are closed. The piston 12 moves towards the cylinder head (not labeled) so as to compress the mixture 35 within the combustion chamber 15. The position at which the piston 12 is at the end of this stroke when the combustion chamber 15 is at its smallest volume is typically referred to as top dead center (TDC).

At the end of the compression stroke, in one non-limiting example, a certain quantity or amount of the second fuel 23 is controlled by the control unit 21 to be directly injected into the combustion chamber 15 via one or more of the injectors 18, 19. Alternatively, the second fuel 23 may be injected into the combustion chamber 15 before the piston 12 moves to the top dead center of the compression stroke.

In this compression stroke, because the mixture 35 is leaner than stoichiometric, the first fuel, such as the natural gas in the mixture 35 may not be prone to auto-ignition. Due to the compression-combustible property, the second fuel 23 may be prone to ignite upon injection into the combustion chamber 15, thereby igniting the mixture 35 of the air and the natural gas so as to trigger combustion accordingly.

As used herein, the term "lean" means a fuel(s)/oxidant(s) mixture having more oxidant(s) than the amount of oxidant(s) required at the stoichiometric point for the particular mixture. The term "stoichiometric" means a fuel(s)/oxidant(s) mixture having exactly enough oxidant(s) required to convert all of the fuel(s) to primary combustion products (e.g., $CO_2$ and $H_2O$ for hydrocarbon fuels).

Next, during the expansion stroke, due to the combustion, expanding gases generated during the combustion push the piston 12 back to BDC. The connecting rod 20 converts the movement of the piston 12 into the rotational energy for further use. Finally, during the exhaust stroke, the exhaust valve 17 opens to release the combusted air-fuel mixture through the exhaust manifold 14 and the piston 12 returns to TDC.

It should be noted that the above operation is merely illustrated as an example. In some examples, instead of injection of the second fuel 23 during the compression stroke, the mixture 22 and the second fuel 23 may be introduced into the combustion chamber 15 to mix together over time therein during the intake stroke prior to any combustion so that the degree of homogeneity of the mixture 35 and the second fuel 23 increases. Subsequent to the mixing, the second fuel 23 is combusted via compression of the piston 12 during the compression stroke.

During operation of the engine 10, the control unit 21 controls the engine operation based on the monitored engine parameters. Based on the monitoring of the parameters of the engine 10, when the engine is detected to operate, for example, in a steady state, the ratio of the first fuel, such as the natural gas to the second fuel, such as the diesel, is high and stable, and reduces the emissions of pollutants.

However, as mentioned above, in some current applications, when the engine operates to respond to a transient condition such as an increased load state (or operation) including the transient acceleration state, typically to switch from a steady state to a transient acceleration state, the quantity of the natural gas may be controlled to increase to a certain amount to provide desirable power. As a result, this causes reduction of the overall air to fuel ratio (AFR) and may cause the auto-ignition of the premixed natural gas during the compression stroke. The premixed natural gas burns volumetrically and may cause detonation or knocking issues in the engine.

Accordingly, in embodiments of the invention, compared to the operation in the steady state, when the engine operates in the increased load state, the quantity of the first fuel may be reduced and the quantity of the second fuel may be increased. Since the second fuel ignites upon injection and thus may not burn volumetrically so that the detonation or knocking issues may be avoided or eliminated.

For some arrangements, during the operation of the engine to respond to the transient requirements such as the increased load state, a first cylinder of the engine may act as a transient cylinder to respond to the increased load condition by decreasing the amount of the first fuel, increasing the amount of the second fuel and increasing the overall fuel rate to generate more power. A second cylinder of the engine may act as a base-load cylinder which operates with a substantially constant ratio of the first fuel to the second fuel, for example in a steady state or adjusting the fuel rate gradually as the air flow or other monitored parameters change.

In some applications, the base-load cylinder may have different operation conditions from the transient cylinder so as to respond slowly to the increased load operation than the transient cylinders. In some examples, a quantity of one of the first fuel, the second fuel, and the oxidant introduced to the first engine cylinder is different from a quantity of one of the first fuel, the second fuel, and the oxidant to the second cylinder based on one or more of the monitored engine parameters. For example, the quantity of the first fuel in the base-load (second) engine cylinder is greater than the quantity of the first fuel in the transient (first) engine cylinder, and the quantity of the second fuel in the base-load engine cylinder is smaller than the quantity of the second fuel in the transient engine cylinder during responding to the increased load operation. As used herein, "one" means one or more. After finishing the increased load operation, the base-load cylinder and the transient cylinder may operate in a similar or an identical steady state mode.

In the transient cylinder, the control unit 21 may control such that the first fuel for introduction therein may be in a range of from about 50% to about 70% of total energy content therein. In one example, the first fuel for introduction may be about 60% of the total energy content therein. In the steady state, the ratio of the first fuel to the second fuel may not vary in the corresponding cylinders, for example may be equal for all of the cylinders of the engine.

Figure 2:
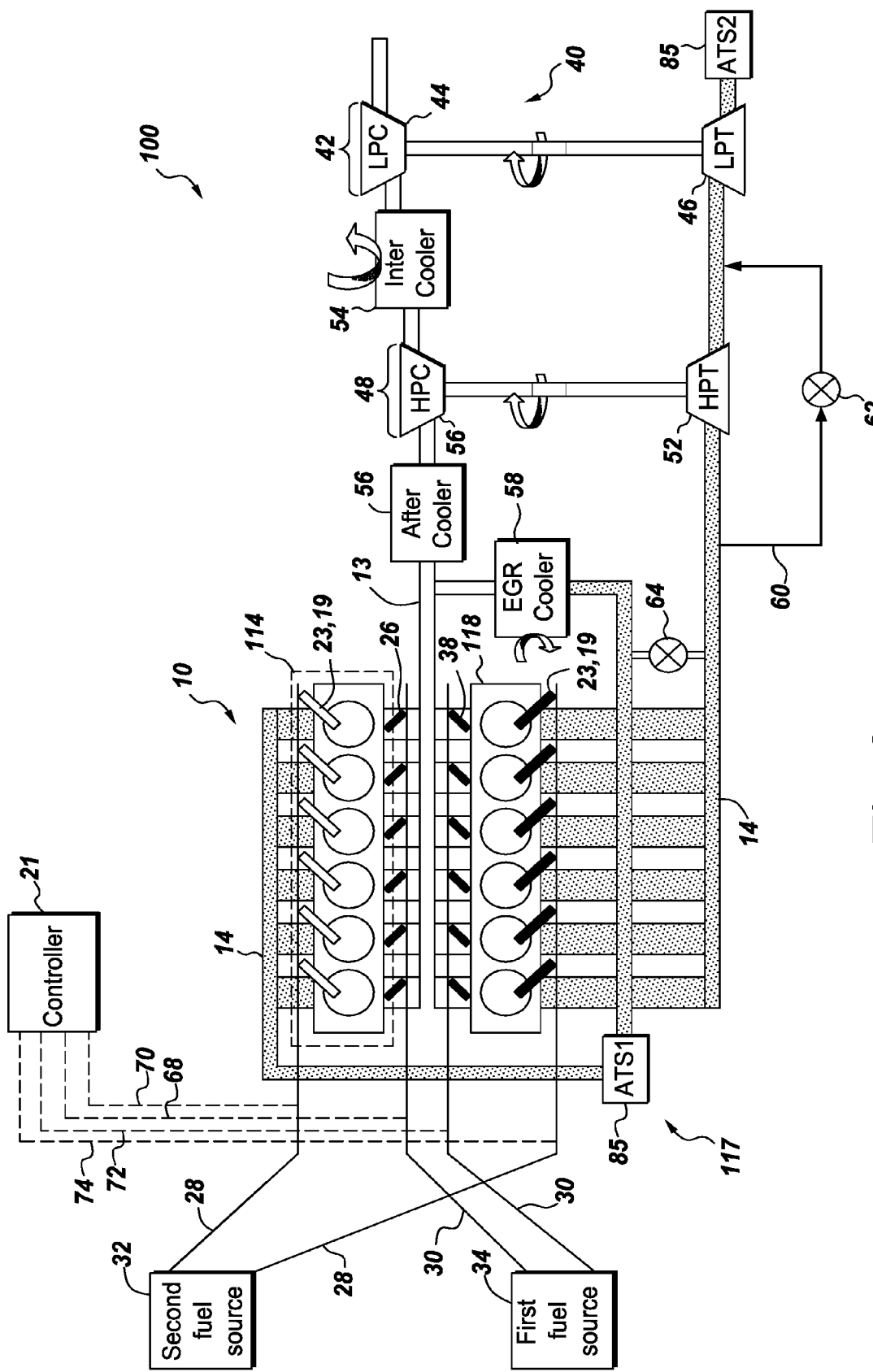
FIG. 2 is a schematic diagram of a system for operating an engine in accordance with one embodiment of the disclosure.

FIG. 2 schematically illustrates an exemplary system 100 for operating an engine 10 in accordance with an embodiment. The engine 10 may include a donor cylinder set 114 having multiple donor cylinders coupled to an intake manifold 13 that is configured to feed a flow of air to the donor cylinder set 114. The engine 10 may also include a non-donor cylinder set 118 coupled to the intake manifold 13 and an exhaust manifold 14. The intake manifold 13 is further configured to feed air to the non-donor cylinder set 118. The engine 10 also includes an exhaust channel 14 extending from the donor cylinder set 114 to the intake manifold 13 for recirculating an exhaust emission in an exhaust gas recirculation (EGR) loop 117 from the donor cylinders to both donor cylinders 114, and non-donor cylinders 118 via the intake manifold 13.

Further each cylinder of the donor cylinder set 114 includes a second direct injector 19, 23 that injects a second fuel 28 from a second fuel source 32. The system 100 also includes a first port injector 26 disposed in each of a plurality of first intake passages configured to inject a first fuel 30 from a first fuel source 34. Similarly, each cylinder of the non-donor cylinder set 118 may also include a third direct injector 19, 23 and a fourth port injector 38. The third direct injector 19, 23 injects the second fuel 28 from the second fuel source 32, while the fourth port injector 38 disposed in each of a plurality of second intake passages 39, injects the first fuel 30 from the first fuel source 34. In one embodiment, the second fuel 28 includes a diesel fuel. In some embodiments, the second fuel 28 includes ammonia. The first fuel 30 may include at least one of natural gas, nitrogen, hydrogen, syngas, gasoline, ethanol, carbon monoxide, propane, biogas, liquid petroleum gas (LPG). In this way, the engine 10 may operate with diesel fuel and natural gas, diesel fuel and hydrogen, ammonia and natural gas, or other combinations of the fuels listed herein.

Furthermore, the system 100 may include a two-staged turbocharger 40 configured to provide compressed air to the dual fuel engine 10 through the intake manifold 13. The two-staged turbocharger 40 includes a first stage turbocharger 42 that includes a low pressure compressor 44 and a low pressure turbine 46. The two-staged turbocharger 40 also includes a second stage turbocharger 48 having a high pressure compressor 50 and a high pressure turbine 52. As shown in FIG. 2, the low pressure compressor 44, the high pressure compressor 50 and the intake manifold 13 are in fluid communication with each other. Ambient air is routed through the low pressure compressor 44 and the high pressure compressor 50 for sufficient compression prior to being directed into the intake manifold 13. The flow of air is cooled in two stages in an intercooler 54 located between the compressors 44, 50 and in an aftercooler 56 located between the high pressure compressor 50 and the intake manifold 13. The exhaust emissions in the exhaust gas recirculation loop 117 are also cooled in an EGR cooler 58 prior to being directed into the intake manifold 13. In one embodiment, each of the intercooler 54, aftercooler 56 and the EGR cooler 58 is a heat exchanger that may utilize a fluid for extracting heat thereby cooling the flow of air and exhaust emissions flowing through each of the cooler. The exhaust emissions flowing out of the non-donor cylinder group 118 through the exhaust manifold 14 are routed through the high pressure turbine 52 and the low pressure turbine 46 prior to being released out of the system 100. As shown in FIG. 2, the high pressure turbine 52 and the low pressure turbine 46 are driven by the force of the exhaust emissions and in turn drive the high pressure compressor 50 and the low pressure compressor 42 respectively. In one embodiment, the system 100 includes a high pressure turbine (HPT) bypass line 60 having a valve 62 that may be operated to route the exhaust emissions directly through the low pressure turbine 46 bypassing the high pressure turbine 52. In another embodiment, the system 100 also includes a valve 64 located in a fluid line connecting the EGR loop 117 and the exhaust manifold 14 for controlling flow of exhaust emissions in the EGR loop 117. In a non-limiting example, the system 100 may include a single staged turbocharger (not shown) configured to provide compressed air to the dual fuel engine 10 through the intake manifold 13.

The system 100 also includes a controller 21 e.g., an electronic control unit (ECU), coupled to various sensors and components throughout the system 100. As shown, the controller 21 includes electrical connections 68, 70, 72 and 74 that are coupled with fuel lines that supply the second fuel 28 and first fuel 30 to the donor cylinder group 114 and the non-donor cylinder group 118. Thus, the controller 21 is configured to, during a single engine cycle, operate the first direct injector 19, 23 and the second port injector 26, the third injector 19, 23 and the fourth port injector 38 in each of the donor cylinder set 114 and the non-donor cylinder set 118 respectively, such that there is a higher fraction of injection of the second fuel into the donor cylinder set in comparison to the second fuel being injected into the non-donor cylinder set and a lower fraction of injection of the first fuel into the donor cylinder set in comparison to the first fuel being injected into the non-donor cylinder set. This operation of differential fueling reduces the risk of knock in the donor cylinder set 114 while maintaining a required power output. In one non-limiting example, a quantity of the second fuel injected into the donor cylinder set 114 is about 40 percent of a total fuel combusted in the donor cylinder set 114, while a quantity of the second fuel injected into the non-donor cylinder set 118 is about 14 percent of a total fuel combusted in the non-donor cylinder set 118. This allows more consumption of the first fuel 30 and thereby, resulting in economical operation of the engine 10. This operation of differential fueling is carried out during high load or high ambient temperature conditions. The dual fuel engine 10 is also configured to operate such that the quantity of the second fuel injected into the donor cylinder set 114 may vary from about one percent to about 100 percent.

Moreover, in one embodiment, during low power load conditions or low ambient temperature conditions, the controller 21 is configured to operate the first direct injector 19, 23 and the second port injector 26 in the donor cylinder set 114 at an optimal second fuel injection timing so as to obtain higher substitution rate of the second fuel 28 as compared to substitution rate of the second fuel 28 in the non-donor cylinder set 118. Further, the terms 'substitution rate' to each cylinder in the donor cylinder set may be defined as a ratio of first fuel 30 supply to a total fuel. This causes generation of emissions from the donor cylinder set with increased amounts of carbon monoxide. The recirculation of the emissions having increased amounts of carbon monoxide from the donor cylinder set 114 to the non-donor cylinder set 118 and the donor cylinder set 114 for further oxidizing the carbon monoxide. It is to be noted that operating the injectors 19, 23, 26 at optimal second fuel injection timing so as to obtain high substitution rate of the second fuel 28 per the first fuel 30 in each cylinder of the donor cylinder set 114 is carried out at low power or low ambient temperature conditions. In another embodiment, at low power or low ambient temperature conditions, each non-donor cylinder of the non-donor cylinder set 118 may be operated at lower substitution rate in order to control emissions, while donor cylinder set 114 may be operated at high substitution rate. It is to be understood that the terms 'substitution rate' to each cylinder in the non-donor cylinder group may be defined as a ratio of first fuel 30 supply to a total fuel supply.

Figure 3:
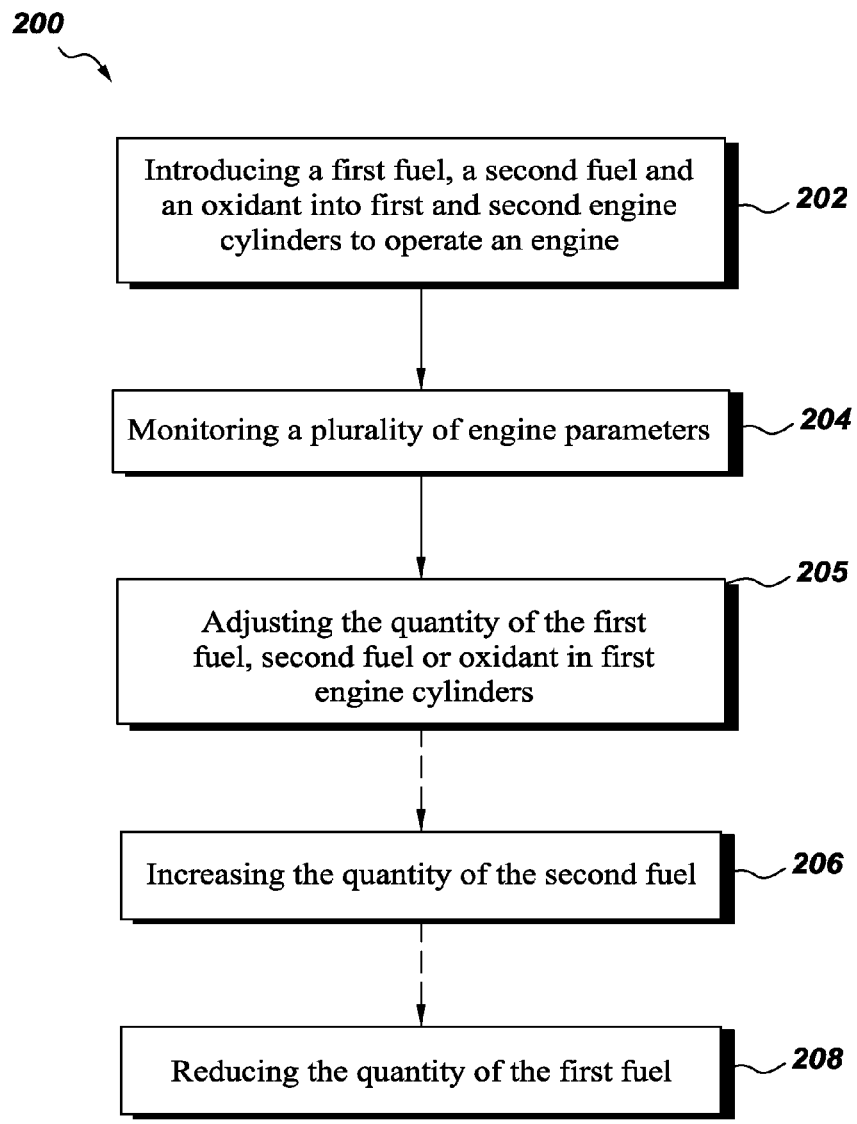
FIG. 3 is a schematic flow chart showing operation of the engine in accordance with one embodiment of the disclosure.

FIG. 3 is a schematic diagram of the method 200 for introduction of the first and second fuels into a first engine cylinder when the engine operates in the increased load state. It should be noted that the arrangement in FIG. 3 is merely illustrative. As mentioned above, more than one engine cylinder may be employed and the more than one engine cylinder may comprise a transient engine cylinder (a first engine cylinder) and a base-load engine cylinder (a second engine cylinder).

As illustrated in FIG. 3, in step 202, introducing a first fuel, a second fuel and an oxidant into the first engine cylinder to operate an engine. In step 204, monitoring a plurality of engine parameters. At step 205, adjusting a first fuel, a second fuel, and/or an oxidant in the first cylinder, based on the monitored engine parameters.

Subsequently, optionally in step 206, based on one or more of the monitored engine parameters, increasing the quantity of the second fuel to be in a range of from about 30% to about 50% of total energy content for introduction into the first engine cylinder. Meanwhile, optionally in step 208, reducing the quantity of the first fuel to be in a range of from about 50% to about 70% in the first engine cylinder.

In some applications, after the increased load operation of the engine finishes, the engine may be controlled to operate in the previous or another steady state, and the ratio of the first fuel to the second fuel is increased and stable accordingly. In some examples, the sequences of introducing the fuels into the cylinder and monitoring the engine parameters may be the same or different. The sequences of the steps 206 and 208 may also be the same or different.

In embodiments of the invention, the ratio of the first fuel to the second fuel is adjusted in some cylinders in response to the engine operation conditions. For example, in the transient acceleration operation, the quantity of the second fuel is increased and the quantity of the first fuel is reduced so as to avoid detonation or knocking issues generated in the engine. At the same time, the total amount of the fuels (for example, the total quantities of the first fuel and the second fuel) supplied is increased to increase the power level.

In addition, the method for operating the engine in response to the transient acceleration condition is relatively simple to retrofit the conventional engines. In certain applications, the method may be used in response to not only the transient acceleration operation but also other transient operations. Non-limiting examples of the transient operation include the operations switched from respective steady states.

The individual cylinders may further be adapted as needed, based on their purpose. For example, the cylinders that are accepting the transient fueling may be equipped with different compression ratio, different valve lift profiles, different sensors or different hardware configurations than the base load cylinders. In some applications, differences of the hardware configurations between the transient cylinders and the respective base load cylinders may comprise one of a valve event, compression ratio, piston, piston ring, valve lift profile, pressure sensor, temperature sensor, knock sensor, injector or injector nozzle.

Commonly assigned U.S. application Ser. No. 14/515,992 entitled DIFFERENTIAL FUELING BETWEEN DONOR AND NON-DONOR CYLINDERS IN ENGINES describes the use of donor and non-donor cylinders as it relates to engine gas recirculation (EGR). The reference is incorporated herein in its entirety.

In other embodiments, the individual cylinders of the engine may comprise a first set and a second set of cylinders wherein the first set is for transient fueling and the second set is for non-transient fueling. The first set may comprise all non-donor cylinders while the second set may comprise donor cylinders. The quantity of cylinders in the first and second set may be equal. In other embodiments, the quantity of cylinders may be different.

In an embodiment, a first and second fuel and oxidant are introduced into a first cylinder set, thereby defining a first substitution rate, while first and second fuel and oxidant are introduced into a second cylinder set, thereby defining a second substitution rate. Various engine parameters are monitored continually or periodically. In response to the engine parameter monitoring, the controller adjusted the first substitution rate in one or more (or all) of the cylinders in the first cylinder set to a third substitution rate that is different than the second substitution rate. The third substitution rate typically is less than the first substitution rate. In an embodiment, the first cylinder set may comprise non-donor cylinders and the second cylinder set may comprise donor cylinders. In another embodiment, the first cylinder set may comprise donor cylinders and the second cylinder set may comprise non-donor cylinders.

In another embodiment, the third substitution rate may be less than the first substitution rate. In an example of this embodiment, the third substitution rate may comprise turning off all first fuel in a single cylinder in the case where a status of a sensor to a cylinder is detecting to not be working (e.g., knock sensor). For example, if a knock sensor for one (or more) cylinder is not working, all natural gas to that particular (or more than one) cylinder is turned off.

In still another embodiment, a monitored engine parameter may comprise ambient temperature. During cold operations (e.g., ambient temperature being below a predetermined threshold), the third substitution rate may be greater than the first substitution rate in the situation where the first cylinder set comprises donor cylinders. For example, during cold operation, the controller can call for an increase in natural gas being introduced into the donor cylinders. One benefit is increased HC or CO emissions that can be oxidized in the non-donor cylinders.

Also during cold ambient and/or cold engine start up conditions an embodiment can advance in the donor cylinders and/or retard timing the non-donor cylinders. In this manner, the non-donor cylinders, having retarded timing, can assist in heating up the exhaust more quickly, so as to activate the aftertreatment system.

In still another embodiment, a monitored engine parameter may comprise either measured or calculated status of an aftertreatment where the aftertreatment system may suffer damage as a result of a sudden increase in temperature beyond a limited temperature (e.g., temperature point, rate of rise, etc.). This may be in conjunction with extended idle or cold operation. For example, the status of the aftertreatment may be that the aftertreatment has accumulated a large amount of flammable material including oil, unburned fuel, and/or particulate. Alternatively, the status of the aftertreatment may be that it is at a relatively low temperature and would suffer from extreme thermal stresses in the event of a sudden increase in temperature. In this embodiment, the fueling may be adjusted such that the temperature of the aftertreatment is controlled to prevent damage.

In a multicylinder engine system with aftertreatment, exhaust from some of the cylinders is fed to an aftertreatment system, while exhaust from other cylinders is not fed to the aftertreatment system. In a donor cylinder engine system, either the set of donor or non-donor cylinders may pass exhaust through an aftertreatment system, while the other set of non-donor or donor cylinders do not pass exhaust through the aftertreatment system. Alternatively, in a multicylinder engine, some cylinders may exhaust directly to the atmosphere while other cylinders exhaust to an aftertreatment system. In this case, the cylinders that exhaust to the aftertreatment system may be operated to minimize exhaust temperature and unburned or partially burned fuel if the status of the aftertreatment system indicates that this could result in an unacceptable rise in temperature. See e.g., FIG. 2 wherein one or more aftertreatment systems 85 (labelled "ATS1" and "ATS2") may be situated in the system 100. For example, an aftertreatment system 85 (ATS1) may be located after the donor cylinders only. In an alternative embodiment, an aftertreatment system 85 (ATS2) may be located only after the low pressure turbine 46. In still another embodiment, both aftertreatment systems 85 (ATS1, ATS2) may be located after the donor cylinders and after the low pressure turbine 46.

Figure 4:
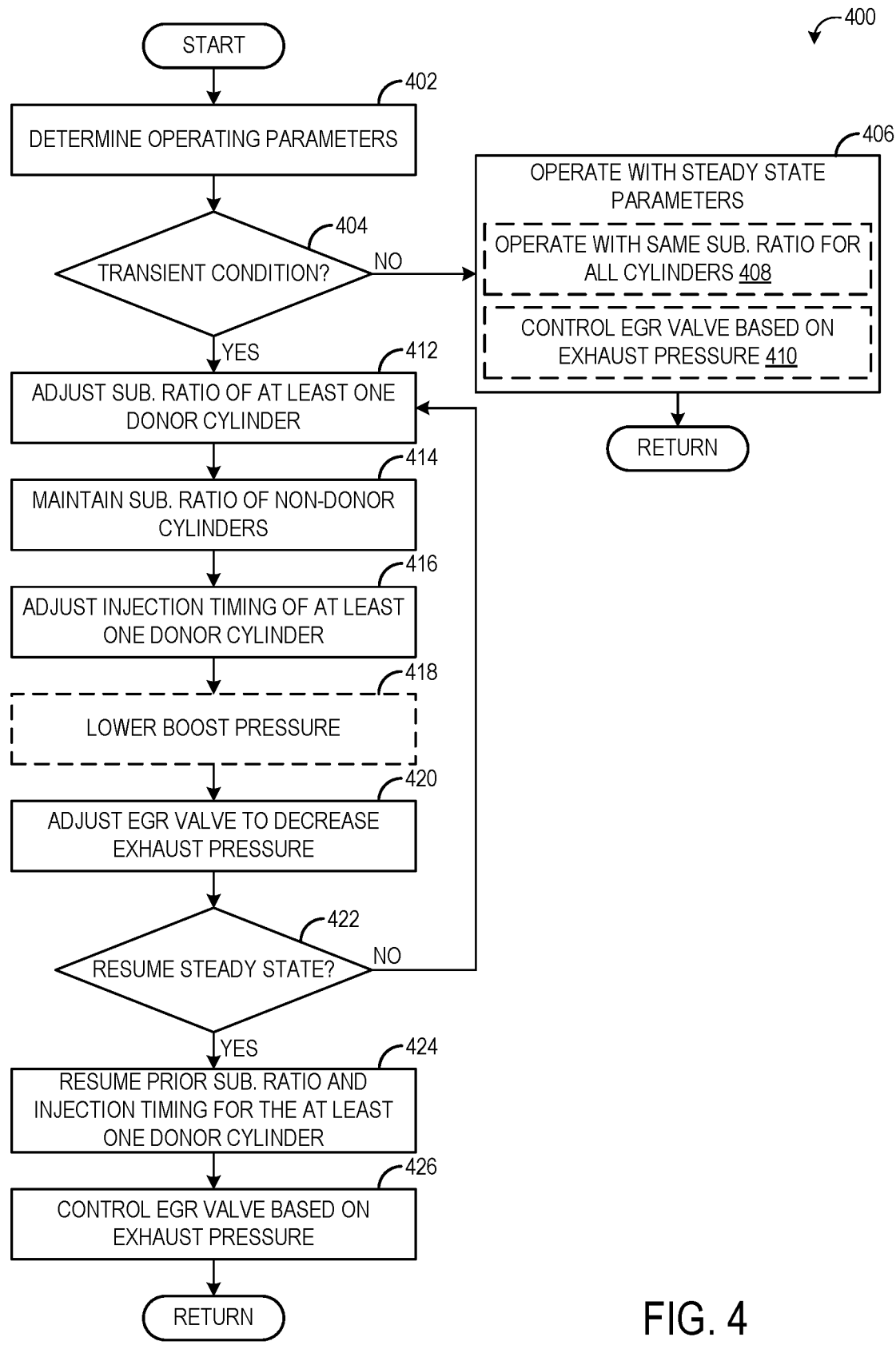
FIG. 4 is a flow chart illustrating a method for operating the engine according to an embodiment of the disclosure.

FIG. 4 illustrates a method 400 for controlling a dual fuel engine, such as engine 10. Method 400 may be carried out with the components shown in FIGS. 1-2, though other configurations are possible without departing from the scope of this disclosure. Method 400 may be carried out according to non-transitory instructions stored in memory of an electronic controller and executed by a processor of the electronic controller, such as controller 21.

At 402, operating parameters are determined. The operating parameters may include current engine load, commanded engine load, engine speed, engine temperature, ambient temperature, and the like, as well as current fueling parameters such as current fuel substitution ratio and fuel injection timing. At 404, method 400 includes determining if the engine is currently operating in, or is initiating, a transient condition. A transient condition may include a change in operating parameters, such as a change in commanded load. When the engine is controlled to move from the current operating point (e.g., current load) to the updated commanded operating point (e.g., an increased load state), the engine operating period during the move from the current operating point to the updated commanded operating point may be considered the transient condition. As another example, when engine load, engine speed, or another engine parameter is changing by more than a threshold amount (e.g., by more than 1-10%), the engine may be considered to be operating in a transient condition.

If the engine is not operating in a transient condition, method 400 proceeds to 406 to operate with steady state operating parameters. The steady state parameters may include operating with a substitution ratio that is the same for all cylinders, as indicated at 408. The substitution ratio may be controlled based on current engine, and may be equal for all cylinders, including the same substitution ratio for the donor cylinders as the non-donor cylinders. Further, during steady state conditions, an EGR valve of the engine (such as valve 64) may be controlled based on exhaust pressure or another suitable parameter (e.g., engine load, intake oxygen fraction), as indicated at 410. However, once the engine operates in steady state, the EGR valve may be generally maintained in the same position due to a relatively steady exhaust pressure, load, etc., being present during the steady state conditions. Method 400 then returns.

Returning to 404, if it is determined that the engine is operating in the transient condition (or is about to enter the transient condition, such as upon a change in load being requested), method 400 proceeds to 412 to adjust the substitution ratio of at least one donor cylinder, while maintaining the prior substitution ratio of the non-donor cylinders, as indicated at 414. In some examples, the substitution ratio may be adjusted for all the donor cylinders. In other examples, the substitution ratio may be adjusted in at least one but not all donor cylinders. The substation ratio in the at least one donor cylinder may be reduced, in some examples. As explained previously, transient conditions, such as transient acceleration conditions where the speed of the engine increases, may result in a higher likelihood of combustion issues such as knocking. The donor cylinders, owing to exhibiting increased exhaust backpressure relative to the non-donor cylinders, may be of increased likelihood of combustion issues relative to the non-donor cylinders. Thus, when the engine shifts to operate in a transient condition, the substitution ratio may be proactively adjusted (e.g., lowered, such that a higher fraction of liquid fuel is delivered to the donor cylinders than the non-donor cylinders) in the at least one donor cylinder relative to the non-donor cylinders. In some examples, in response to the transient condition, the total amount of fuel to both the donor cylinders and non-donor cylinders may be adjusted (e.g., increased). In other examples, the total amount of fuel to the non-donor cylinders may be maintained and the total amount of fuel may be increased to the at least one donor cylinder (while also adjusting the substitution ratio).

In some examples, in response to the transient condition, the injection timing of the at least one donor cylinder may be adjusted to proactively address potential combustion issues such as pre-ignition. For example, some fuels such as hydrogen may be prone to pre-ignition during higher engine loads. Thus, ignition timing may be adjusted (e.g., retarded) in the at least one donor cylinder responsive to a transient condition. In some examples, both the substitution ratio and the ignition timing may be adjusted in response to any type of transient load increase. In other examples, only the ignition timing or the substitution ratio may be adjusted in response to load increases below a threshold load, and then both the substitution ratio and ignition timing may be adjusted in response to load increases above the threshold e.g., increasing to maximum rated load. Further, in some examples, boost pressure may be lowered in response to the transient condition, as indicated at 418. Lowering boost pressure may lower combustion temperatures and reduce the likelihood of combustion issues. Boost pressure may be lowered by adjusting (e.g., opening) a turbine bypass valve, such as valve 62 of FIG. 2. Due to the common intake system, the boost pressure may be lowered to both the donor cylinders and the non-donor cylinders.

At 420, method 400 includes adjusting the EGR valve to decrease exhaust pressure. During the transient condition (e.g., transient load increase), exhaust backpressure may increase, which may further cause combustion issues in the donor cylinders. Thus, the EGR valve may be adjusted (e.g., moved to a more open position) to route additional exhaust gas from the donor cylinders to the exhaust, rather than back to the intake. Adjusting the EGR valve may result in a change in the intake oxygen fraction, so the adjustment to the EGR valve may be performed to prevent excessive exhaust backpressure while also maintaining a target EGR amount/intake oxygen fraction. However, during the transient condition, it may be desirable to increase the intake oxygen fraction and hence lower the EGR amount, which may be accomplished by opening the EGR valve.

At 422, method 400 includes determining if the engine has resumed steady state operation. Once the transient condition ends (e.g., the commanded load is reached), the engine speed and engine load may resume steady state operation, where the speed and load are maintained at a stable speed and load. If the engine has not resumed steady state (e.g., engine speed and/or load are still changing), method 400 loops back to 412 to continue to adjust (or maintain in the adjusted state) the substitution ratio, injection timing, boost pressure, and/or EGR valve position. If the engine has resumed steady state operation, method 400 proceeds to 424 to resume operating at the prior substation ratio and injection timing for the at least one donor cylinder. For example, if the substitution ratio in the at least one donor cylinder was reduced during the transient condition, the substitution ratio may be increased in the at least one cylinder, back to the prior substation ratio and equal to the substitution ratio of the non-donor cylinders. If the commanded load change also resulted in a commanded change in substitution ratio (for all the cylinders), the substitution ratio for the at least one donor cylinder may be adjusted to the new commanded substitution ratio rather than the prior substitution ratio. In either case, upon the steady state conditions being resumed, the substitution ratio for the donor cylinders may be the same as the non-donor cylinders. Additionally, the EGR valve may continue to be controlled based on exhaust pressure, as indicated at 426. For example, the EGR valve may be moved to a more closed position (more closed than during the transient condition) and may be adjusted from the more closed position to control exhaust pressure. Method 400 then returns.

Thus, method 400 provides for control of combustion stability during transient conditions in an engine with donor cylinders and non-donor cylinders that is configured to operate with multiple fuels, such as diesel and natural gas or diesel and hydrogen. However, as explained above, in some engine configurations, the engine may be configured to operate with ammonia and natural gas. In such examples, the control of combustion issues during transients may be different owing to the low burn rate of ammonia and natural gas. For example, excess exhaust residuals that may be maintained in the donor cylinders may result in misfire in donor cylinders fueled with ammonia and natural gas. To prevent misfire, the substitution ratio may be proactively increased in the donor cylinders during a transient condition, such that a higher fraction of gaseous fuel is delivered to the donor cylinders than the non-donor cylinders. Further, the EGR valve may be opened to reduce external EGR.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A system for a vehicle, comprising:
a controller configured to, during a single engine cycle and responsive to a first condition, deliver a lower fraction of a first fuel into a donor cylinder of an engine of the vehicle in comparison to a fraction of the first fuel being injected into a non-donor cylinder of the engine and deliver a higher fraction of a second fuel into the donor cylinder in comparison to a fraction of the second fuel being injected into the non-donor cylinder, wherein the first condition includes a transient acceleration condition.

2. The system of claim 1, wherein the controller is further configured to, responsive to a second condition, deliver a higher fraction of the first fuel into the donor cylinder in comparison to a fraction the first fuel being injected into the non-donor cylinder and deliver a lower fraction of the second fuel into the donor cylinder in comparison to a fraction of the second fuel being injected into the non-donor cylinder.

3. The system of claim 2, wherein the second condition includes low load and/or low ambient temperature conditions.

4. The system of claim 1, wherein the first fuel is gaseous fuel and the second fuel is liquid fuel.

5. The system of claim 1, wherein the first or second fuel is ammonia.

6. The system of claim 1, wherein the first or second fuel is hydrogen.

7. The system of claim 1, wherein the first condition includes high engine load and/or high ambient temperature conditions.

8. The system of claim 1, wherein a commanded power output of the donor cylinder is the same as a commanded power output of the non-donor cylinder during the single engine cycle.

9. The system of claim 1, wherein the engine includes an exhaust channel extending from the donor cylinder to an intake manifold for recirculating an exhaust emission in an exhaust gas recirculation (EGR) loop from the donor cylinder to both the donor cylinder and the non-donor cylinder via the intake manifold.

10. The system of claim 1, wherein a quantity of the second fuel injected into the donor cylinder is about 40 percent of a total fuel combusted in the donor cylinder and a quantity of the second fuel injected into the non-donor cylinder is about 14 percent of a total fuel combusted in the non-donor cylinder.

11. A method, comprising:
introducing a first fuel, a second fuel, and an oxidant into a transient fueling cylinder set at a first substitution rate;
introducing the first fuel, the second fuel, and the oxidant into a non-transient fueling cylinder set at a second substitution rate; and
responsive to a monitored engine parameter, adjusting the first substitution rate in one or more or all of the cylinders in the transient fueling cylinder set to a third substitution rate that is different than the second substitution rate.

12. The method of claim 11, wherein the transient fueling cylinder set comprises donor cylinders and the non-transient fueling cylinder set comprises non-donor cylinders.

13. The method of claim 12, wherein the third substitution rate is greater than the first substitution rate.

14. The method of claim 13, wherein the monitored engine parameter is ambient temperature.

15. The method of claim 11, further comprising an aftertreatment device fluidly coupled to the transient fueling cylinder set, and wherein the monitored engine parameter is a status of the aftertreatment device.

16. A system, comprising:
an exhaust gas recirculation system (EGR) comprising an exhaust channel extending from a donor cylinder to an intake manifold for recirculating an exhaust emission from the donor cylinder to both the donor cylinder and a non-donor cylinder via the intake manifold; and
a controller configured to, responsive to a first condition:
adjust a position of an EGR valve coupled between the donor cylinder and an exhaust passage; and
decrease a substitution ratio of a first fuel relative to a second fuel in the donor cylinder while maintaining a prior substitution ratio of the first fuel relative to the second fuel in the non-donor cylinder,
wherein the first condition comprises a transient acceleration condition.

17. The system of claim 16, wherein the controller is configured to adjust the position of the EGR valve to a more open position responsive to the first condition.

* * * * *